United States Patent
Ghannam et al.

(10) Patent No.: US 10,493,937 B2
(45) Date of Patent: Dec. 3, 2019

(54) RESTRAINT DEVICE DEPLOYMENT CALIBRATION

(71) Applicant: Ford Global Technologies, LLC, Dearborn, MI (US)

(72) Inventors: Mahmoud Yousef Ghannam, Canton, MI (US); Kirk David Arthurs, Newport, MI (US); Todd N. Clark, Dearborn, MI (US); Edward Joseph Abramoski, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 326 days.

(21) Appl. No.: 15/421,523

(22) Filed: Feb. 1, 2017

(65) Prior Publication Data
US 2018/0215335 A1    Aug. 2, 2018

(51) Int. Cl.
*B60R 21/0136* (2006.01)
*B60R 21/013* (2006.01)
*B60R 21/01* (2006.01)

(52) U.S. Cl.
CPC ........ *B60R 21/0136* (2013.01); *B60R 21/013* (2013.01); *B60R 2021/01013* (2013.01); *B60R 2021/01034* (2013.01); *B60R 2021/01231* (2013.01); *B60R 2021/01272* (2013.01)

(58) Field of Classification Search
None
See application file for complete search history.

(56) References Cited

U.S. PATENT DOCUMENTS

| | | | |
|---|---|---|---|
| 6,125,313 A | 9/2000 | Watanabe et al. | |
| 6,219,606 B1 | 4/2001 | Wessels et al. | |
| 6,301,535 B1 | 10/2001 | Nusholtz et al. | |
| 6,532,408 B1 | 3/2003 | Breed | |
| 6,549,836 B1 * | 4/2003 | Yeh ...................... | B60R 21/013 180/282 |
| 6,662,092 B2 | 12/2003 | Wang et al. | |
| 7,236,865 B2 | 6/2007 | Prakah-Asante et al. | |
| 7,778,755 B2 | 8/2010 | Lich et al. | |
| 7,912,607 B2 | 3/2011 | Miller et al. | |
| 8,463,500 B2 | 6/2013 | Cuddihy et al. | |
| 2003/0071444 A1 | 4/2003 | Knox | |
| 2005/0114108 A1 | 5/2005 | Cooper et al. | |

(Continued)

FOREIGN PATENT DOCUMENTS

EP    3272592 A1    1/2018

OTHER PUBLICATIONS

Search Report dated Jul. 20, 2018 from the United Kingdom Intellectual Property Office regarding Application No. GB1801500.8 (4 pages).

(Continued)

*Primary Examiner* — Todd M Melton
*Assistant Examiner* — Jason R Roberson
(74) *Attorney, Agent, or Firm* — Frank A. MacKenzie; Bejin Bieneman PLC

(57) ABSTRACT

A method for developing restraint device deployment timings includes selecting a first restraint device as a reference device, determining a deployment time range for the first restraint device, selecting a second restraint device, and determining a deployment time range for the second restraint device relative to the deployment time range of the first restraint device.

20 Claims, 5 Drawing Sheets

(56) References Cited

U.S. PATENT DOCUMENTS

2016/0137152 A1* 5/2016 Park .................... B60R 21/0132
　　　　　　　　　　　　　　　　　　　　701/45
2017/0072822 A1* 3/2017 Vijayan ................ B60R 21/207

OTHER PUBLICATIONS

Kendall, P.E., Jesse et al, "Air Bag Deployment Criteria," Institute of Risk & Safety Analyses; Oct. 21, 2014; 24 pages.

* cited by examiner

Unbelted First Restraint Device (Airbag) (AB1Unbelted)

| Collision Characteristic | Calibration Timings | | |
| --- | --- | --- | --- |
| | Target Time | Minimum Time | Maximum Time |
| Rigid Barrier Low Speed | 5"-30ms | Target -$\Delta 1$ | Target +$\Delta 1$ |
| Rigid Barrier High Speed | 5"-30ms | Target -$\Delta 1$ | Target +$\Delta 2$ |
| Angular Rigid Barrier | 5"-30ms | Target -$\Delta 1$ | Target +$\Delta 1$ |
| Offset Deformable Barrier | 5"-30ms | Target -$\Delta 1$ | Target +$\Delta 1$ |
| Center Pole | 5"-30ms | Target -$\Delta 1$ | Target +$\Delta 1$ |
| Vehicle-to-Vehicle | 5"-30ms | Target -$\Delta 1$ | Target +$\Delta 1$ |

FIGURE 6A

Belted First Restraint Device (Airbag) (AB1Belted)

| Collision Characteristic | Calibration Timings | | |
| --- | --- | --- | --- |
| | Target Time | Minimum Time | Maximum Time |
| Rigid Barrier Low Speed | AB1Unbelted +$\Delta 3$ | Target -$\Delta 1$ | Target +$\Delta 1$ |
| Rigid Barrier High Speed | AB1Unbelted +$\Delta 3$ | Target -$\Delta 1$ | Target +$\Delta 2$ |
| Angular Rigid Barrier | AB1Unbelted +$\Delta 3$ | Target -$\Delta 1$ | Target +$\Delta 1$ |
| Offset Deformable Barrier | AB1Unbelted +$\Delta 3$ | Target -$\Delta 1$ | Target +$\Delta 1$ |
| Center Pole | AB1Unbelted +$\Delta 3$ | Target -$\Delta 1$ | Target +$\Delta 1$ |
| Vehicle-to-Vehicle | AB1Unbelted +$\Delta 3$ | Target -$\Delta 1$ | Target +$\Delta 1$ |

FIGURE 6B

RESTRAINT DEVICE DEPLOYMENT CALIBRATION

BACKGROUND

Automotive vehicles are often equipped with multiple restraint devices such as airbags, pretensioners, seat belts, etc. A restraint control module located in the vehicle deploys the restraint devices during a collision.

BRIEF DESCRIPTION OF THE DRAWINGS

FIGS. 6A-6C illustrate example tables showing the calibration timings for the deployment of various restraint control devices in accordance with different passenger conditions and vehicle conditions.

DETAILED DESCRIPTION

The restraint control module deploys restraint devices according to various timings relative to when an impact is detected. Those timings are often stored in a table accessible to the restraint control module. When an impact is detected, the restraint control module accesses the table to get the timing for each restraint device and deploys the restraint device according to the timing indicated in the table.

Rather than develop separate timings for every restraint control device, the timings for some restraint devices can be based on the timing of another (i.e., a "reference") restraint device. A process for developing restraint device deployment timings relative to a reference restraint device includes selecting a first restraint device as a reference device, determining a deployment time range for the first restraint device, selecting a second restraint device, and determining a deployment time range for the second restraint device relative to the deployment time range of the first restraint device. The deployment time ranges can be collected in a table and uploaded to the vehicle. The restraint control module can apply the timings stored in the table during a collision.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Figure 1:
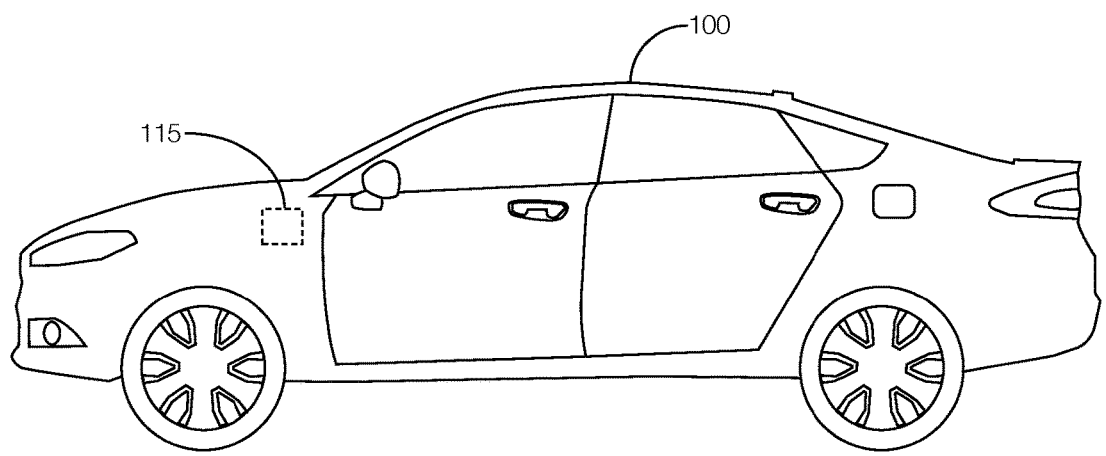
FIG. 1 illustrates an example vehicle with a restraint control module that deploys various restraint control devices according to particular calibration timings during a collision.
Figure 2:
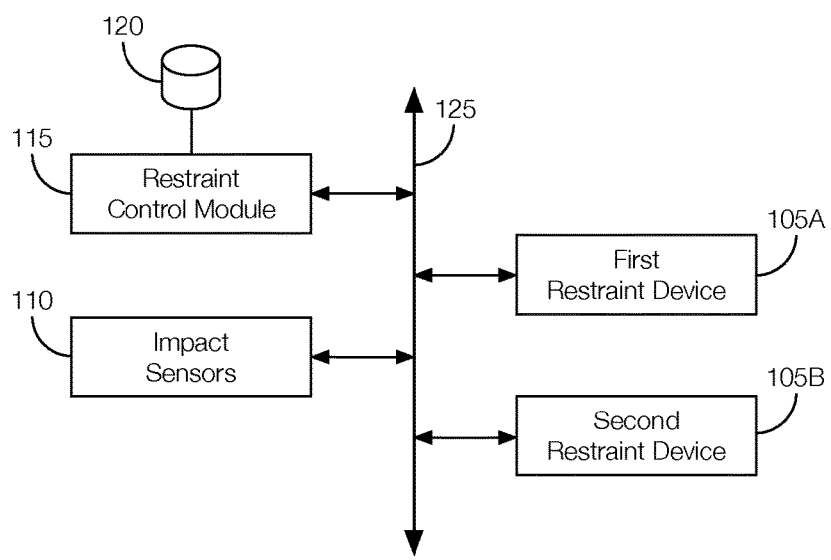
FIG. 2 is a block diagram showing example components of the vehicle.

As illustrated in FIGS. 1 and 2, a host vehicle 100 includes multiple restraint devices (collectively, 105), multiple impact sensors 110, and a restraint control module 115 programmed to deploy the restraint devices 105 according to particular timings during a collision detected by one or more of the impact sensors 110. Although illustrated as a sedan, the host vehicle 100 may include any passenger or commercial automobile such as a car, a truck, a sport utility vehicle, a crossover vehicle, a van, a minivan, a taxi, a bus, etc. The host vehicle 100 may be an autonomous vehicle that can operate in an autonomous (e.g., driverless) mode, a partially autonomous mode, and/or a non-autonomous mode.

The restraint devices 105 may be airbags, pretensioners, seatbelts, etc. Each airbag may be formed of a woven polymer or any other material. As one example, the airbag may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane. One or more of the airbags may be located in an airbag module. The airbag module may include a housing, an inflator, and the airbag. The inflator and the airbag may be disposed in the housing in the uninflated position. The housing provides a reaction surface for the airbag in the inflated position. The housing may be formed of any material, e.g., a rigid polymer, a metal, a composite, etc. The operation of the inflator may be controlled by, e.g., the restraint control module 115. That is, in the event of an impact, the restraint control module 115 may receive a signal output by the impact sensor 110, and in response, output a signal to the inflator commanding the inflator to discharge. The inflator may discharge and inflate the airbag in response to receiving the signal from the restraint control device. Each seat belt includes webbing attached to the seat frame. The other end of the webbing feeds into a retractor, which may include a spool that extends and retracts the webbing. A clip slides freely along the webbing and, when engaged with the buckle, divides the webbing into a lap band and a shoulder band. Each pretensioner, which may be incorporated into or otherwise associated with a particular seatbelt, may be implemented as a ball-in-tube pretensioner, in which an explosive charge propels a ball or balls over a cogwheel connected to the cable, a piston pretensioner, in which an explosive charge drives a piston attached to the cable, a mechanical pretensioner, in which a compressed spring attached to the cable is released, or the like.

The impact sensors 110 are programmed to detect an impact to the host vehicle 100. The impact sensor 110 may be, e.g., post-contact sensors, such as accelerometers, pressure sensors, and contact switches, pre-impact sensors, such as radar, LIDAR, and vision-sensing systems, or a combination of both. The vision systems may include one or more cameras, CCD image sensors, CMOS image sensors, etc. The impact sensors 110 may be located at numerous points in or on the vehicle. When an impact is detected, the impact sensor 110 outputs a signal to the restraint control module 115 representing that a collision is occurring.

The restraint control module 115 is a microprocessor-based controller implemented via circuits, chips, or other electronic components. The restraint control module 115 may include a processor, memory, etc. The memory of the restraint control module 115 may store instructions executable by the processor as well as for electronically storing data and/or databases, such as a table 120 storing calibration timings for deploying the restraint devices 105 under various circumstances, discussed below. The restraint control module 115 may be in communication with and may control deployment of the restraint devices 105 located in the host vehicle 100, among other functions. The restraint control module 115 is programmed to receive and process the signals output by the impact sensors 110 to, e.g., determine the type of impact, also referred to as a "collision characteristic." Examples of collision characteristics include a rigid barrier collision, a deformable barrier collision, a center pole collision, a vehicle-to-vehicle collision, a low speed collision, a high speed collision, an angular collision, and an offset collision. The restraint control module 115 may further be programmed to determine certain passenger characteristics, such as if a passenger is wearing a seat belt. Thus, the passenger characteristic may indicate whether the passenger is a belted passenger or an unbelted passenger. The restraint control module 115 may determine the passenger characteristic in accordance with signals output by one or more sensors associated with the seat or seat belt. For instance, the restraint control module 115 may determine the passenger characteristic based on signals output by an occupant detection system. The restraint control module 115 is programmed to receive the impact signal, determine the collision characteristic, determine the passenger characteristic, access a table 120 stored in the memory, and deploy the restraint devices 105 according to the calibration timings indicated in the table 120.

The restraint control module 115, restraint devices 105, and impact sensors 110 are in communication with one another over a communication network 125. The communication network 125 includes hardware, such as a communication bus, for facilitating communication among vehicle components. The communication network 125 may facilitate wired or wireless communication among the vehicle components in accordance with a number of communication protocols such as controller area network (CAN), Ethernet, WiFi, Local Interconnect Network (LIN), and/or other wired or wireless mechanisms.

Figure 3:
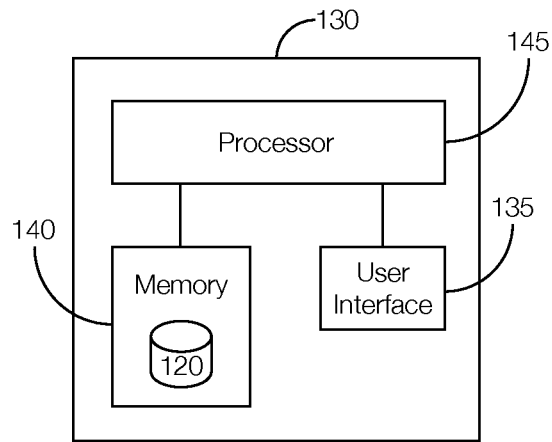
FIG. 3 is a block diagram showing example components of a computer for generating the calibration timings.

Referring now to FIG. 3, a computer 130 for generating the calibration timings includes a user interface 135, a memory 140, and a processor 145. The computer 130 may be a desktop computer, a laptop computer, a tablet computer, a mobile phone, or the like.

The user interface 135 includes hardware (including circuits, chips, or other electronic components) that receives user inputs from a user of the computer 130. Examples of such hardware may include a keyboard, mouse, a touch-sensitive display screen. The user interface 135 further includes hardware (including circuits, chips, or other electronic components) that can be used to present information to the user. Examples of such hardware may include a display screen, such as the touch-sensitive display screen previously mentioned.

The memory 140 is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory 140 may store the table 120 with the calibration timings. As discussed in greater detail below, the table 120 may relate particular restraint devices 105 to particular calibration timings. Moreover, the table 120 may relate the calibration timings for each restraint device 105 to one or more passenger characteristic, collision characteristic, or both. Further, the table 120 may identify one restraint device 105 as a "reference device" and list calibration timings for the other restraint devices 105 relative to the reference device.

The processor 145 is implemented via circuits, chips, or other electronic components, and is programmed to generate the calibration timings and store the calibration timings in the table 120. The processor 145 is programmed to select one restraint device 105 (e.g., a "first restraint device 105A") as a reference device. The processor 145 may select the first restraint device 105A as the reference device in accordance with a user input received via the user interface 135 and communicated, from the user interface 135, to the processor 145. The processor 145 may be further programmed to determine a deployment time range (referred to as a "first deployment time range") for the first restraint device 105A. The first deployment time range is the minimum and maximum amount of time since the impact is detected at which the first restraint device 105A should be deployed.

The first deployment time range may be based on a first target deployment time defined as the time to fully deploy the first restraint device 105A before the passenger travels a certain distance (e.g., 5 inches) during a collision. The time to travel that distance may be referred to as the "displacement time." The time to fully deploy the first restraint device 105A may be referred to as the "first predetermined time." Since different types of restraint devices 105 will fully deploy over different lengths of time, the processor 145 may be programmed to determine the appropriate displacement time and select the appropriate first predetermined time (e.g., Δ3 for pretensioners and 30 ms for airbags, although other times are possible) and subtract the selected first predetermined time from the displacement time to determine the first target deployment time. For example, if it takes 30 ms for the first restraint device 105A to fully deploy, the first target deployment time may be defined so that the first restraint device 105A has time (e.g., 30 ms) to fully deploy before the occupant travels 5 inches. This particular target deployment time may be referred to as "5"–30 ms."

The first target deployment time may be further subject to a passenger characteristic and one or more collision characteristics. That is, the amount of time for the passenger to travel 5 inches (i.e., the displacement time) may be different if the passenger is wearing a seatbelt (e.g., a belted passenger versus an unbelted passenger), how fast the vehicle is moving, whether the collision involves a rigid barrier or another vehicle, etc. Determining the first deployment time range may include selecting a first passenger characteristic. The processor 145 may be programmed to select the first passenger characteristic in accordance with a user input received via the user interface 135. In the example below, the first passenger characteristic is an "unbelted passenger." The processor 145 may be programmed to determine the first target deployment time associated with the first passenger characteristic. In some instances, the first target deployment time associated with the first passenger characteristic may be based on a user input provided to the user interface 135.

The processor 145 may be programmed to determine a first minimum deployment time, which is the minimum amount of time after detecting the impact to deploy the first restraint device 105A. The first minimum deployment time may define one boundary (i.e., the lower boundary) of the first deployment time range. The processor 145 may be programmed to determine the first minimum deployment time by subtracting a second predetermined time from the first target deployment time. The second predetermined time may be based on a user input received via the user interface 135. For instance, the second predetermined time may be, e.g., on the order of 1-10 ms, although other lengths of time are possible. In some possible approaches, the second predetermined time is based, at least in part, on a passenger characteristic, a collision characteristic, or both.

The processor 145 may be programmed to determine a first maximum deployment time, which is the maximum amount of time after detecting the impact to deploy the first restraint device 105A. The first maximum deployment time may define the upper boundary of the first deployment time range. The processor 145 may be programmed to determine the first maximum deployment time by adding a third predetermined time to the first target deployment time. The third predetermined time may be based on a user input received via the user interface 135. For instance, the third predetermined time may be, e.g., on the order of a few milliseconds, although other lengths of time are possible. Moreover, the length of the third predetermined time may be based on the passenger characteristic, the collision characteristic, or both. That is, the third predetermined time may be on the order of 1-10 ms for a belted passenger in a vehicle that hits a rigid barrier at a low speed (e.g., lower than 25 mph) and lower for an unbelted passenger in a vehicle that hits a rigid barrier at a high speed (e.g., greater than 25 mph).

The processor 145 may be further programmed to determine a second deployment time range for another restraint device 105 (i.e., the "second restraint device 105B") based on the first deployment time range, specifically, from the first target deployment time. That is, the processor 145 may be programmed to determine a second target deployment time. The second target deployment time is defined as the first target deployment time adjusted by the amount of time to fully deploy the second restraint device 105B. The time to fully deploy the second restraint device 105B may be referred to as a "fourth predetermined time." The processor 145 may determine the fourth predetermined time based on a user input provided to the user interface 135. The fourth predetermined time may be a function of, e.g., a passenger characteristic, a collision characteristic, or both. For instance, the fourth predetermined time may be 0 ms for an unbelted passenger and Δ3 for a belted passenger.

The processor 145 may be programmed to determine a second minimum deployment time, which is the minimum amount of time after detecting the impact to deploy the second restraint device 105B. The second minimum deployment time may define one boundary (i.e., the lower boundary) of the second deployment time range. The processor 145 may be programmed to determine the second minimum deployment time by subtracting a fifth predetermined time from the second target deployment time. The fifth predetermined time may be based on a user input received via the user interface 135. For instance, the fifth predetermined time may be, e.g., on the order of 1-10 ms, although other lengths of time are possible. In some possible approaches, the fifth predetermined time is based, at least in part, on a passenger characteristic, a collision characteristic, or both.

The processor 145 may be programmed to determine a second maximum deployment time, which is the maximum amount of time after detecting the impact to deploy the second restraint device 105B. The second maximum deployment time may define the upper boundary of the second deployment time range. The processor 145 may be programmed to determine the second maximum deployment time by adding a sixth predetermined time to the second target deployment time. The sixth predetermined time may be based on a user input received via the user interface 135. For instance, the sixth predetermined time may be, e.g., on the order of 1-10 ms, etc., although other lengths of time are possible. Moreover, the length of the sixth predetermined time may be based on the passenger characteristic, the collision characteristic, or both. That is, the sixth predetermined time may be 1-10 ms for a belted passenger in a vehicle that hits a rigid barrier at a low speed (e.g., lower than 25 mph) and lower for an unbelted passenger in a vehicle that hits a rigid barrier at a high speed (e.g., greater than 25 mph).

The processor 145 may be further programmed to limit the second maximum deployment time relative to the first target deployment time. For example, if the second restraint device 105B is a pretensioner, the processor 145 may be programmed to limit the second maximum deployment time to the first target deployment time if adding the sixth predetermined time to the second target deployment time is greater than the first target deployment time. In other words, the processor 145 may be programmed to limit the second maximum deployment time to a value less than or equal to the first target deployment time.

The processor 145 may be programmed to develop additional deployment time ranges based on the first target deployment time, the second target deployment time, etc., for each restraint device 105 located in the host vehicle 100. The processor 145 is programmed to generate the table 120 that relates the various times discussed above, including the first deployment time range and the second deployment time range, to the corresponding restraint device 105 and in view of various passenger characteristics, collision characteristics, or both. The processor 145 may be programmed to upload the table 120 to the host vehicle 100 so that the values in the table 120 can be applied by the restraint control module 115 when an impact is detected. Specifically, in response to detecting an impact at the host vehicle 100, the restraint control module 115 can deploy the first restraint device 105A according to the first deployment time range and the second restraint device 105B according to the second deployment time range.

Figure 4:
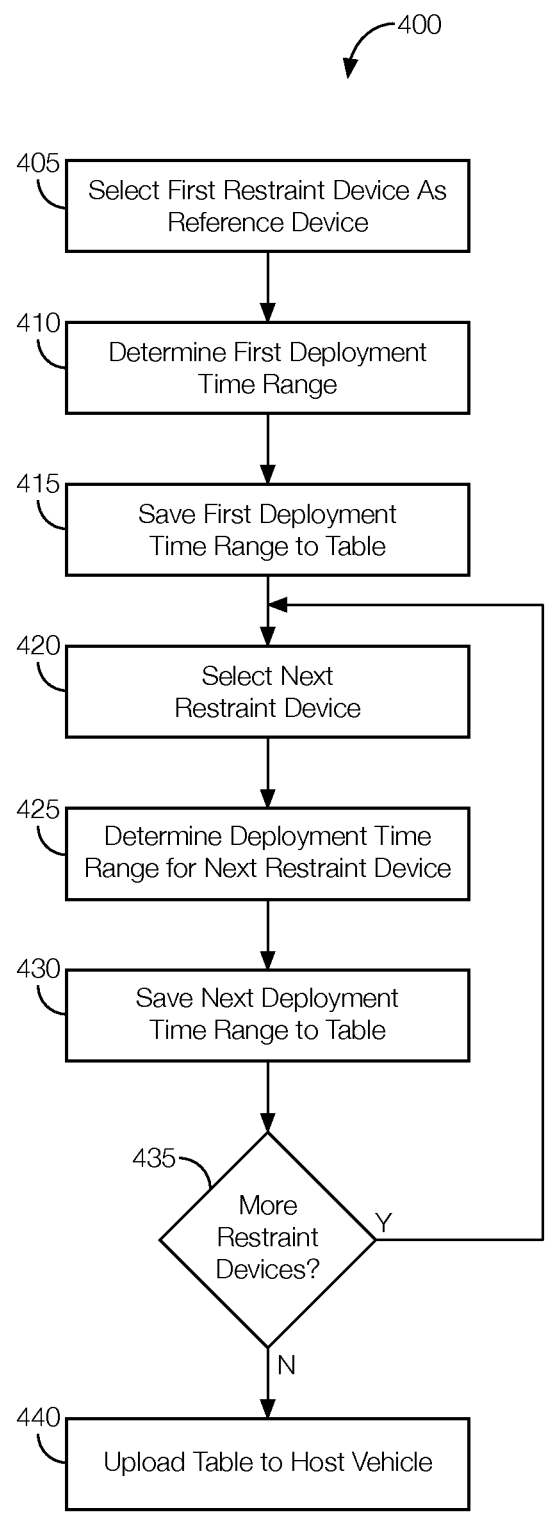
FIG. 4 is a flowchart of an example process executed by the computer to generate the calibration timings.

FIG. 4 is a flowchart of an example process 400 executed by the computer 130 to generate the calibration timings stored in the table 120. The process may be executed by the computer 130.

At block 405, the computer 130 selects a first restraint device 105A as a reference device. The processor 145 may select the first restraint device 105A as the reference device in accordance with a user input provided to the user interface 135. That is, the user may provide a user input to the user interface 135 selecting one of the restraint devices 105 (e.g., the "first restraint device 105A"). The user may provide an additional user input indicating a desire for the first restraint device 105A to be the reference device. The processor 145 may process the user inputs and select the first restraint device 105A as the reference device in response to the user inputs. In some possible approaches, the processor 145 may be programmed to automatically select one of the restraint devices 105 as the reference device.

At block 410, the computer 130 determines the first deployment time range. The first deployment time range is the minimum and maximum amount of time since the impact is detected at which the first restraint device 105A should be deployed. The processor 145 is programmed to determine the first deployment time range based on the first target deployment time defined as the time to fully deploy the first restraint device 105A before the passenger travels a certain distance (e.g., 5 inches) during a collision, as discussed above. The first target deployment time may be further subject to a passenger characteristic and one or more collision characteristics. That is, the amount of time for the passenger to travel 5 inches (i.e., the displacement time) may be different if the passenger is wearing a seatbelt (e.g., a belted passenger versus an unbelted passenger), how fast the vehicle is moving, whether the collision involves a rigid barrier or another vehicle, etc. Determining the first deployment time range may include the processor 145 selecting a first passenger characteristic, a first collision characteristic, or both. Further, as previously discussed, determining the first deployment time range may include the processor 145 determining a first minimum deployment time and a first maximum deployment time. The first minimum deployment time is the minimum amount of time after detecting the impact to deploy the first restraint device 105A. The processor 145 may be programmed to determine the first minimum deployment time by subtracting the second predetermined time from the first target deployment time. The second predetermined time may be based on a user input received via the user interface 135 or may be automatically provided by the processor 145, e.g., in accordance with the passenger characteristic, the collision characteristic, or both. The first maximum deployment time is the maximum amount of time after detecting the impact to deploy the first restraint device 105A. The processor 145 may be programmed to determine the first maximum deployment time by adding a third predetermined time to the first target deployment time. The third predetermined time may be based on a user input received via the user interface 135 or automatically provided by the processor 145, e.g., in accordance with the passenger characteristic, the collision characteristic, or both. The processor 145 may be programmed to develop the deployment time range (i.e., the target deployment time, the minimum deployment time, and the maximum deployment time) for each possible passenger characteristic and collision characteristic for the first restraint device 105A. That is, block 410 may repeat until the deployment time range has been determine for all passenger characteristics, collision characteristics, or both, for the first restraint device 105A.

At block 415, to generate the table 120, the computer 130 saves the first deployment time range to the table 120. That is, the processor 145 may be programmed to save the first target deployment time, the first minimum deployment time, and the first maximum deployment time to the table 120. Moreover, the processor 145 may associate one of more of those values to, e.g., a passenger characteristic, a collision characteristic, or both.

At block 420, the computer 130 selects the next restraint device 105 for processing. The processor 145 may select the next restraint device 105 (e.g., the second restraint device 105B) in accordance with a user input provided to the user interface 135. The processor 145 may process the user input and select the second restraint device 105B in response to the user input. In some possible approaches, the processor 145 may be programmed to automatically select one of the restraint devices 105 as the second restraint device 105B.

At block 425, the computer 130 determines the second deployment time range relative to the first deployment time range. The second deployment time range is the minimum and maximum amount of time since the impact is detected at which the second restraint device 105B should be deployed. The processor 145 is programmed to determine the second deployment time range based on the second target deployment time. The second target deployment time is defined as the first target deployment time adjusted by a fourth predetermined time. The fourth predetermined time may be based on a user input provided to the user interface 135 or may be a function of, e.g., a passenger characteristic, a collision characteristic, or both. The processor 145 may be further programmed to determine the second minimum deployment time, which is the minimum amount of time after detecting the impact to deploy the second restraint device 105B, by subtracting the fifth predetermined time from the second target deployment time. The fifth predetermined time may be based on a user input received via the user interface 135 or based on a passenger characteristic, a collision characteristic, or both. The processor 145 may also be programmed to determine the second maximum deployment time, which is the maximum amount of time after detecting the impact to deploy the second restraint device 105B, by adding a sixth predetermined time to the second target deployment time. The sixth predetermined time may be based on a user input received via the user interface 135 or based on the passenger characteristic, the collision characteristic, or both. In some instances, the processor 145 may limit the second maximum deployment time relative to the first target deployment time. For example, if the second restraint device 105B is a pretensioner, the processor 145 may be programmed to limit the second maximum deployment time to the first target deployment time if adding the sixth predetermined time to the second target deployment time is greater than the first target deployment time. In other words, the processor 145 may be programmed to limit the second maximum deployment time to a value less than or equal to the first target deployment time. Moreover, the processor 145 may be programmed to develop the deployment time range (i.e., the target deployment time, the minimum deployment time, and the maximum deployment time) for each possible passenger characteristic and collision characteristic for the first restraint device 105A. That is, block 425 may repeat until the deployment time range has been determine for all passenger characteristics, collision characteristics, or both, for the second restraint device 105B.

At block 430, the computer 130 saves the second deployment time range to the table 120. That is, the processor 145 may be programmed to save the second target deployment time, the second minimum deployment time, and the second maximum deployment time to the table 120. Moreover, the processor 145 may associate one of more of those values to, e.g., a passenger characteristic, a collision characteristic, or both.

At decision block 435, the computer 130 determines whether more restraint devices 105 need to be evaluated. The processor 145 is programmed to determine whether the table 120 has been populated with the deployment time ranges for every restraint device 105, every passenger characteristic, and every collision characteristic for the host vehicle 100. If the table 120 is not complete, the process 400 returns to block 420 so that deployment time ranges can be determined for additional restraint devices 105. If the table 120 is complete, the process 400 proceeds to block 440.

At block 440, the computer 130 uploads the table 120 to the host vehicle 100. The processor 145 may transmit the table 120 to a memory located in the host vehicle 100 via, e.g., a communication interface.

Figure 5:
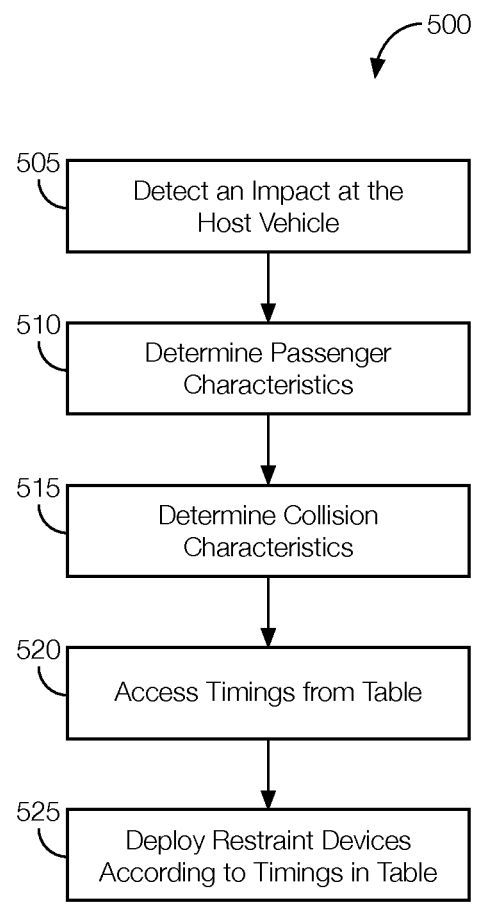
FIG. 5 is a flowchart of an example process executed by the restraint control module.

FIG. 5 is a flowchart of an example process 500 that may be executed by the restraint control module 115 to implement the calibration timings listed in the table 120 generated via the process 400 shown in FIG. 4.

At block 505, the restraint control module 115 detects an impact at the host vehicle 100. The restraint control module 115 may detect the impact based on signals output by one or more of the impact sensors 110.

At block 510, the restraint control module 115 determines a passenger characteristic. The passenger characteristic may indicate whether the passenger is a belted passenger or an unbelted passenger. The restraint control module 115 may determine the passenger characteristic based on signals output by, e.g., an occupant detection system sensor.

At block 515, the restraint control module 115 determines the collision characteristic. The collision characteristic may represent one or more of a rigid barrier collision, a deformable barrier collision, a center pole collision, a vehicle-to-vehicle collision, a low speed collision, a high speed collision, an angular collision, and an offset collision. The restraint control module 115 may determine the collision characteristic based on the impact sensors 110 that output signals, the magnitude of the signals output by the impact sensors 110, the speed of the host vehicle 100 at the time of the impact, etc.

At block 520, the restraint control module 115 accesses the table 120. For instance, the restraint control module 115 accesses the table 120 from a memory of the host vehicle 100 and queries the table 120 for the passenger characteristic determined at block 510 and the collision characteristic determined at block 515 for each restraint device 105 located in the host vehicle 100.

At block 525, the restraint control module 115 deploys the restraint devices 105 located in the host vehicle 100 according to the timings stored in the table 120 accessed at block 520. Since the timings for the second restraint device 105B (e.g., the second deployment time range) stored in the table 120 are based on the timings for the first restraint device 105A (e.g., the first deployment time range, and specifically, the first target deployment time), the restraint devices 105 are deployed, in response to the impact, according to the first deployment time range of the first restraint device 105A that served as the reference device at the time the table 120 was generated.

Figure 6C:

FIGS. 6A-6C illustrate example tables 600A-C showing the calibration timings for the deployment of various restraint control devices in accordance with different passenger conditions and vehicle conditions.

Referring now to FIG. 6A, the table 600A shows calibration timings for the reference device. In the table 600A, the reference device is an airbag. Moreover, the target deployment time, referred to as the "Target Time," is based on an unbelted passenger, and specifically "5"–30 ms," which is the amount of time for an unbelted passenger to travel 5 inches minus the time to deploy the airbag (i.e., 30 ms in the example of FIG. 6A). The deployment time range is defined by the minimum deployment time (shown in the "Minimum Time" column) and the maximum deployment time (shown in the "Maximum Time" column). Both of those times reference the target deployment time ("Target$-\Delta 1$"; "Target$+\Delta 1$", "Target$+\Delta 2$"). Further, the table 600A allows for the times to be customized given various collision characteristics or combinations of collision characteristics. Although shown with variables ("5"–30 ms", "Target", etc.) actual time values may be stored in the table 600A in accordance with the process 400.

FIG. 6B illustrates an example table 600B for the reference device but with a different passenger characteristic (e.g., a belted passenger). In the table 600B, the "Target Time" references the "Target Time" ($AB1_{unbelted}$) of Table 600A. In the table 600B, the "Target Time" for the reference device is "$AB1_{unbelted}+\Delta 3$", which means that the reference device is deployed $\Delta 3$ later when the passenger is belted than when the passenger is unbelted. Further, the table 600B allows for the times to be customized given various collision characteristics or combinations of collision characteristics. Also, while variables are shown, the actual time values may be stored in the table 600B during the process 400.

FIG. 6C illustrates an example table 600C for another restraint device 105 (e.g., the second restraint device 105B). The "Target Time" of the table 600C references the "Target Time" ($AB1_{unbelted}$) of Table 600A. In the table 600C, the "Target Time" for the reference device is "$AB1_{unbelted}-\Delta 3$", which means that the second restraint device 105B is deployed $\Delta 3$ before the reference device. Further, the table 600C allows for the times to be customized given various collision characteristics or combinations of collision characteristics. Moreover, the "Minimum Time" column of the table 600C refers to timings that are not related to the reference device. For example, as illustrated in the table 600C, the minimum deployment time is based on no-deploy conditions. Moreover, the table 600C also indicates that constraints are placed on the "Maximum Time" column. In general, the maximum deployment time is defined in the table 600C as "Target$+\Delta 1$" or "Target$+\Delta 2$" depending on the collision characteristic or collection of collision characteristics. The maximum deployment time further indicates that the maximum deployment time cannot exceed the $AB1_{unbelted}$ time. Also, while variables are shown, the actual time values may be stored in the table 600C during the process 400.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A controller comprising a processor and a memory, the memory storing instructions executable by the processor such that the controller is programmed to:
   store a first deployment time range for a first restraint device selected as a reference device and a deployment time range for a second restraint device, wherein:
      the deployment time range for the second restraint device is determined relative to the deployment time range of the first restraint device, and
      the deployment time range for the first restraint device includes determining a displacement time that is a time to fully deploy the first restraint device before a passenger has traveled a specified distance;
   the controller further programmed to detect an impact at the host vehicle; and
   actuate deployment of the first restraint device and the second restraint device according to the deployment time range for the first restraint device and the second restraint device, respectively, in response to detecting the impact.

2. The controller of claim 1, wherein the deployment time range for the first restraint device is further determined by subtracting a first predetermined time from the displacement time to determine a first target deployment time.

3. The controller of claim 2, wherein the deployment time range for the first restraint device is further determined by subtracting a second predetermined time from the first target deployment time to determine a first minimum deployment time.

4. The controller of claim 3, wherein the deployment time range for the first restraint device is further determined by adding a third predetermined time to the first target deployment time to determine a first maximum deployment time.

5. The controller of claim 4, wherein at least one of the second predetermined time and the third predetermined time is associated with a collision characteristic.

6. The controller of claim 5, wherein the collision characteristic represents at least one of a rigid barrier collision, a deformable barrier collision, a center pole collision, a vehicle-to-vehicle collision, a low speed collision, a high speed collision, an angular collision, and an offset collision.

7. The controller of claim 4, wherein a deployment time range for the second restraint device relative to the deployment time range of the first restraint device is determined by adjusting the first target deployment time by a fourth predetermined time to determine a second target deployment time.

8. The controller of claim 7, wherein the fourth predetermined time is based at least in part on a passenger characteristic representing one of a belted passenger and an unbelted passenger.

9. The controller of claim 7, wherein the deployment time range for the second restraint device is further determined by subtracting a fifth predetermined time from the second target deployment time to determine a second minimum deployment time.

10. The controller of claim 7, wherein the deployment time range for the second restraint device is further determined by adding a sixth predetermined time to the second target deployment time to determine a second maximum deployment time.

11. The controller of claim 10, wherein the second maximum deployment time is less than or equal to the first target deployment time.

12. The controller of claim 1, wherein at least one of the first restraint device and the second restraint device is at least one of an airbag and a pretensioner.

13. The controller of claim 1, wherein the deployment time range for the first restraint device is further determined by selecting a first passenger characteristic.

14. A system, comprising:
a first passenger restraint device;
a second passenger restraint device; and
controller means for detecting an impact at the host vehicle and actuating deployment of a first restraint device and the second restraint device according to respective deployment time ranges for the first restraint device and the second restraint device in response to detecting the impact;
wherein the controller means stores the first deployment time range for the first restraint device selected as a reference device, and the deployment time range for the second restraint device,
wherein the deployment time range for the second restraint device is determined relative to the deployment time range of the first restraint device, and the deployment time range for the first restraint device includes determining a displacement time that is a time to fully deploy the first restraint device before a passenger has traveled a specified distance.

15. The system of claim 14, wherein the deployment time range for the first restraint device is further determined by selecting a first passenger characteristic.

16. The system of claim 14, wherein the deployment time range for the first restraint device is further determined by subtracting a first predetermined time from the displacement time to determine a first target deployment time.

17. The system of claim 16, wherein the deployment time range for the first restraint device is further determined by subtracting a second predetermined time from the first target deployment time to determine a first minimum deployment time.

18. The system of claim 17, wherein the deployment time range for the first restraint device is further determined by adding a third predetermined time to the first target deployment time to determine a first maximum deployment time.

19. The system of claim 18, wherein at least one of the second predetermined time and the third predetermined time is associated with a collision characteristic.

20. The system of claim 19, wherein the collision characteristic represents at least one of a rigid barrier collision, a deformable barrier collision, a center pole collision, a vehicle-to-vehicle collision, a low speed collision, a high speed collision, an angular collision, and an offset collision.

* * * * *